Figure 1:
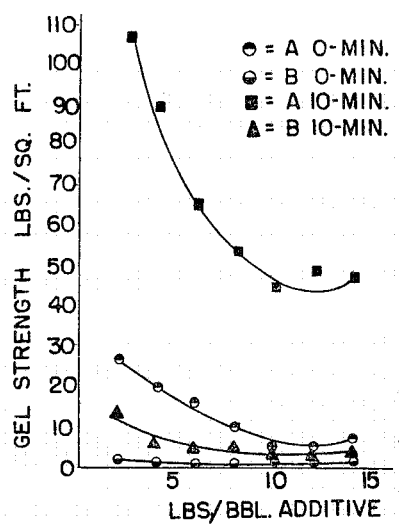

INVENTORS
LLOYD EUGENE VAN BLARICOM
FREDERIC ALAN JOHNSTON
BY Pennie Edmonds
Morton, Taylor & Adams

ATTORNEYS

United States Patent Office 3,270,003
Patented August 30, 1966

3,270,003
IRON COMPLEXED SULFONATED POLYFLAVO-
NOIDS AND THEIR PREPARATION
Lloyd Eugene Van Blaricom and Frederic Alan Johnston, Shelton, Wash., assignors to Rayonier Incorporated, Shelton, Wash., a corporation of Delaware
Filed Aug. 7, 1964, Ser. No. 388,038
2 Claims. (Cl. 260—236.5)

This application is a continuation-in-part of our application Serial No. 809,550, filed April 28, 1959, now abandoned.

This invention relates generally to soluble reaction products or derivatives of bark and quebracho wood. More specifically, the invention relates to the sulfited derivatives of certain coniferous tree barks and quebracho wood, and has for its object the complexing of the derivatives with a soluble ferrous iron salt, and provides improved polyflavonoid products therefrom.

Coniferous tree barks and quebracho wood are known to contain substantial amounts of polyflavoid materials that are copolymers of polyhydroxy flavan-3-ols and polyhydroxy flavan-3,4-diols. These condensed tannin-like polymers, while otherwise quite similar in characteristics, range from low-molecular weight, water-soluble tannins through alcohol-soluble phlobaphenes to high-molecular weight phenolic acids that are not soluble in neutral solvents. All, when suitably sulfonated, are useful in forming the iron-complexed products of this invention.

The polyflavonoids in quebracho wood (*Schinopsis lorentzii* and *Schinopsis balsansai*) are generally of the water-soluble or low-molecular weight type and classified as tannins. Their unpolymerized precursors are believed to be fisetinidol for the polyhydroxy flavan-3-ols and leucofisetinidin for the polyhydroxy flavan-3,4-diols. The polyflavonoids in coniferous tree barks are similar but cover a much wider range with regard to molecular weights. In their case the precursors of the polyflavonoids are believed to be catechin for the polyhydroxy flavan-3-ols and leucocyanidin for the polyhydroxy flavan-3,4-diols. The following are structural formulas for catechin and leucocyanidin.

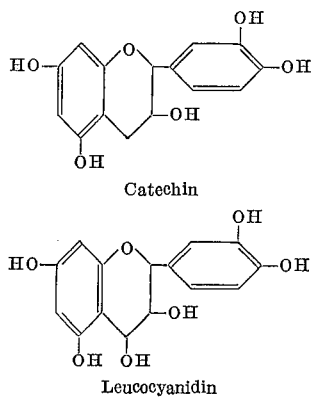

Catechin

Leucocyanidin

By the use of the proper conditions the polyfluavonoids in either quebracho wood or coniferous tree barks can be sulfonated and solubilized. We believe sulfonation takes place at the 4-hydroxyl group in the pyran ring of the flavan-3,4-diol units. In the present invention we have found that the soluble sulfonated materials are then readily complexed with soluble salts of ferrous iron to form improved products of increased utility. Sulfonation of the polyflavonoids is by digestion at elevated temperatures with aqueous solutions of salts of sulfurous acid. Conditions must be carefully controlled so that no free sulfurous acid is present during said digestion and so that the high molecular weight phlobaphenic polyflavonoids are solubilized but lignin components present in the quebracho wood or bark are not. (Conifer and quebracho lignins, of course, differ substantially in structure and other characteristics from the polyflavonoids. For example, they are generally considered to be polymers formed from phenyl propane derivatives of coniferyl alcohol and have substantially lower phenolic hydroxyl contents.)

Iron-complexing of the water-soluble, sulfonated polyflavonoids (preferably while still in aqueous solution) takes place on contact at ambient temperatures and pH's of about 4 to 6. Vigorous agitation during addition of the ferrous salt is required, particularly if in a dry state, to prevent gelling and to obtain uniformly complexed products. It was surprising to find that water-soluble, iron-complexes of polyflavonoids can be formed in this manner, which remain water-soluble even in the presence of alkalis. It has long been known that unsulfonated condensed tannins (including those from quebracho wood and conifer barks) form insoluble precipitates or "lakes" under similar conditions.

While the ferrous-complexed, sulfonated polyflavonoids of this invention are useful in many applications where metallic polyphenolic materials are used, we have found them to be particularly useful for the correction of chlorosis (iron deficiency) in plants and the control of the viscosity of drilling muds in earth boring operations.

Agriculture has long sought an effective means of combatting chlorosis in plants growing in iron deficient soils but available methods and products so far have much to be desired. Ferrous sulfate and other such salts by themselves are essentially ineffective when applied to soils and are toxic to plants when applied to foliage in amounts the are effective. More or less the same situation also holds with the inefficient and relatively expensive iron-chelating agents that are sometimes used. The sulfonated iron-complexes, on the other hand, are almost completely devoid of phytotoxicity and can be used on leaves of deciduous fruit trees in concentrations and with efficiencies approaching ten times that of the prior art materials with a corresponding advantage in results obtained. It is believed that the markedly improved efficiency of the products of the invention results from the high content of phenolic hydroxyl groups and the surprising absence of phytotoxicity when used in high concentrations to the neutrality of the product (pH 4 to 6.5) and the similarity of the polyflavonoids therein to those present in the plants themselves.

The products of the invention have been found to be very effective in application to the leaves of deciduous fruit trees such as pears, prunes, peaches and apples to prevent chlorosis, and to the leaves of citrus trees such as orange trees which are chlorotic to overcome iron deficiency.

In the treatment of deciduous trees, the leaves are sprayed with a water solution containing from three to ten pounds per one hundred gallons of water containing any spreader suitable for liquids applied to plants.

In treating citrus and similar evergreen trees which are chlorotic, it is effective to spray the under surfaces of the leaves with from eight to ten pounds of the product in one hundred gallons of water containing a surfactant that will cause the product to enter the leaves through the stomata. It is necessary to spray the solution on the under surfaces of the leaves in the early morning when the stomata are open. The results are soon noticeable by a change from sickly green to normal dark green.

The iron complexed sulfonated polyflavonoids of the invention have been found to be very effective in controlling the rheological properties of various drilling muds. They are very effective in fresh water muds, lime base muds, salt contaminated muds, gyp muds and oil emulsion muds. They are especially effective in fresh water muds which are relatively low in contaminants. In actual field drilling operations the iron complexed sulfonated polyflavonoids of our invention are outstandingly successful in the initial drilling of a well in which contamination is low or practically absent. The advantages in the initial drilling are manifested by the low percentages of the product required to achieve an effective lowering of the viscosity.

Sulfited polyflaxonoid derivatives of coniferous barks and unsulfited quebracho wood extracts are widely used as viscosity and fluid loss control agents for clay-containing aqueous or oil-emulsion drilling muds. In many instances, they perform their intended functions quite satisfactorily. When substantial contamination, such as with salt or gypsum, is encountered, however, their effectiveness is greatly reduced. Electrolyte contamination of this type causes colloidal clay components in the mud to start to gel, undesirably raising viscosities and gel strengths. On the other hand, field experience indicates that in many cases an improved mud can be obtained by deliberately adding (contaminating) a fresh water mud with appreciable amounts of gypsum, if the viscosity and gel strength can be controlled. Such a gypsum-containing mud possesses certain advantages, including high temperature stability and a decreased tendency to hydrate and swell the shale and clay formations being drilled. We have discovered that complexing certain sulfited bark and quebracho extracts with iron overcomes the adverse effects of gypsum contamination and enhances its beneficial effects when said products are used as control agents in aqueous clay-containing drilling muds.

Suitable sulfonated extracts for iron complexing by the methods of this invention can be obtained in good yields by digesting suitably comminuted specimens of the coniferous barks or quebracho wood at elevated temperatures in aqueous solutions of sodium sulfite or bisulfite, potassium sulfite or bisulfite, and/or mixtures of the same. Digestion temperatures should be kept within a range of 105° C. to 200° C., with the preferred range being 150 to 175° C. Below 105° C. good yields are difficult to obtain and the final product is inferior when used as a drilling mud additive, whether complexed with iron or not. Over 200° C. no appreciable gain in net yield is obtained, and the high temperature tends to degrade the product rather drastically. Suitable digestion times will range from about 15 to 240 minutes, with the period used being adjusted roughly inversely to the temperature. Sufficient chemical should be present in the digestion liquor at the start of the extraction to supply from about 0.03 to 0.2 part $SO_2$ per part of oven-dry bark or wood to be digested. We have found that a slight excess of chemical must still be present at the conclusion of the digestion to act as a buffer, and it will not be if much less than 0.03 part $SO_2$ per part bark is used. On the other hand, if more than 0.2 part $SO_2$ per part bark is used the yield is not appreciably increased, while the excess chemical remaining in the product after digestion is an unnecessary contaminant. Consistency during digestion is not particularly critical so long as sufficient liquid is present for uniform reaction, but the consistency will most conveniently range between about 10 to 20% oven-dry bark or quebracho wood based on the weight of the total charge. Aqueous extracts of quebracho wood, such as the common commercial extract, can also be sulfited in a similar manner. Unsulfonated polyflavonoids do not appear to be improved by complexing and are not useful in the invention.

Iron complexing of the extracts is most conveniently accomplished while they are still dissolved in the digestion liquor immediately after its separation from the undissolved residue. If the extract-containing liquor is alkaline at this point, it should be adjusted to slightly on the acid side with a suitable acid such as sulfuric or sulfurous (preferably a pH of 4.5 to 6.0) to prevent possible gelling of the product upon addition of the ferrous iron salt. Sufficient soluble iron salt is then added to provide from about 2.0 to 14.0% iron based on the total weight of the extracted solids with a preferred range of from 3.0 to 8.0%. The iron salt can be added as a solid or as an aqueous solution, but in either case good mixing should be provided to insure product uniformity. Indeed, if the solid is used, special care must be taken to provide vigorous agitation to prevent agglomeration and floating at the point of admixture. In our preferred embodiment of this step we add copperas ($FeSO_4 \cdot 7H_2O$) equivalent to 5.0 to 6.0% iron based on the weight of the extract solids as an aqueous solution. Copperas is effective, cheap, and in good commercial supply. Ferric salts do not form as effective or applicable complexes, either for use in drilling muds or for treating plants. Example II shows that the use of ferric chloride produces a less effective product for use in drilling muds. The use of ferric salts gives a more acid product and this damages the foliage of plants when used to correct iron chlorosis. We, therefore, use only ferrous salts in our invention.

Complexing in the process of this invention takes place rapidly and on contact. Immediately after mixing the active ingredients, the solution can be spray or drum dried to yield a soluble dark grayish-brown powdered product. Temperature is not particularly critical but should not go too high for any appreciable length of time. Under certain conditions, we have found that the temperature of the iron-complexed product solution can be maintained as high as 80 to 90° C. for 4 or 5 hours, but no advantage is gained thereby over a simple room temperature reaction.

Extensive investigation indicates that the derivatives benefited by the process of our invention include those from the barks of western hemlock (*Tsuga heterophylla*), Amabilis fir (*Abies amabilis*), Douglas fir (*Pseudotsuga menziesii*), and southern pine (*Pinus elliotti, Pinus palustris, Pinus taeda* and *Pinus echinata*) trees and quebracho wood (known as "Quebracho Colorado" or *Schinopsis lorentzi* and *Schinopsis balansae*).

The following examples illustrate details of preferred embodiments of the invention:

EXAMPLE I

The preparation of a typical product of this invention by complexing iron and a sulfited extract of hemlock bark and the effectiveness of the product as a control agent for a typical contaminated fresh water mud are illustrated in this example. An examination of the results in Table I will demonstrate the improvement in both viscosities and gel strengths brought about by the iron complexing. The bark extract without complexing is typical of the best control agents now on the market.

Comminuted hemlock bark was digested in an autoclave with a solution containing a mixture of 75% $NaHSO_3$ and 25% $Na_2SO_3$ equivalent to a ratio of 0.07 parts $SO_2$ to 1.0 part dry bark. The digestion was carried out for 45 minutes at a temperature of 170° C., after which the liquor was drained off, the bark residue pressed to recover additional liquor, and the combined drainings and pressings evaporated to approximately 40% total solids. This solution was then divided into several portions and $FeSO_4 \cdot 7H_2O$ (copperas) in aqueous solution added thereto with agitation to give the varying proportions of iron to bark derivative as indicated. The several mixtures were then spray dried to yield products containing from 0 to 14% iron on extract solids.

For comparability of results in mud testing, a large sample of base mud was prepared by mixing 800 parts of bentonite clay with 8000 parts distilled water and aging the mixture overnight at room temperature. The base mud was remixed for 15 minutes at high speed with a propeller-type mixer and then was ready for use. Test samples of fresh water contaminated mud were prepared from the base mud by taking aliquots and adding thereto NaOH to a pH between 7.4 to 7.9 and gypsum and additive at the rate of 1 lb./bbl. and 4 lbs./bbl., respectively. The test samples were then mixed at high speed for 10 minutes, aged overnight at 70° C., remixed and tested by procedures approved by the American Petroleum Institute (A.P.I.). The results are tabulated in Table I below, and clearly show the unexpected increase in effectiveness of the complexed products.

*Table 1*

| Iron Salt Added | Percent Iron to Extract | Viscosity Apparent, cps. | Gel Strength | | Fluid Loss, mls./30 min. |
|---|---|---|---|---|---|
| | | | 0 min. | 10 min. | |
| Control | None | 24 | 12 | 28 | 7.6 |
| $FeSO_4$ | 1.0 | 25 | 7 | 26 | 7.4 |
| $FeSO_4$ | 2.0 | 27 | 3 | 27 | 7.0 |
| $FeSO_4$ | 3.0 | 23 | 2 | 12 | 7.4 |
| $FeSO_4$ | 4.0 | 26 | 2 | 8 | 7.4 |
| $FeSO_4$ | 5.0 | 24 | 2 | 6 | 8.6 |
| $FeSO_4$ | 6.0 | 29 | 2 | 4 | 6.9 |
| $FeSO_4$ | 8.0 | 30 | 2 | 5 | 7.2 |
| $FeSO_4$ | 10.0 | 31 | 2 | 6 | 7.6 |
| $FeSO_4$ | 12.0 | 33 | 2 | 9 | 7.9 |
| $FeSO_4$ | 14.0 | 31.5 | 2 | 8 | 8.6 |

EXAMPLE II

The increase in effectiveness that complexing with iron confers on a sulfited bark extract when used in a "gypsum"-type mud as control agent is shown in the following example. The complexed bark extracts were prepared in exactly the same manner as those used in Example I.

The base mud was prepared by mixing 600 parts of bentonite clay with 8000 parts distilled water and aging the mixture overnight at room temperature. It was then remixed for 15 minutes with a propeller-type mixer. Gypsum-type mud test samples were prepared by taking aliquots of this base mud and adding NaOH to a pH of 8.4 to 9.3 and $CaSO_4 \cdot 2H_2O$ in a proportion of 5 lbs./bbl., and stirring each sample at high speed for 5 minutes. Additive was then added in the amount of 4 lbs./bbl. The mud test samples were now stirred once more for 5 minutes at high speed and tested by the standard A.P.I. methods. The results are given in Table 2 without aging.

It will be noted that in the case of a gypsum mud as contrasted with a fresh water mud the greatest improvement is obtained when 5% iron is complexed with the bark product. Also it will be noted that bark products complexed with $FeCl_3$ were not improved in this case, as shown by high 10 minute gel strengths.

*Table 2*

| Iron Salt Added | Percent Iron to Extract | Viscosity Apparent, cps. | Gel Strengths | |
|---|---|---|---|---|
| | | | 0 min. | 10 min. |
| Control | None | 28 | 10 | 24 |
| $FeSO_4$ | 1.0 | 26.5 | 13 | 36 |
| $FeSO_4$ | 2.0 | 18 | 5 | 29 |
| $FeSO_4$ | 3.0 | 15 | 1 | 16 |
| $FeSO_4$ | 4.0 | 18 | 1 | 7 |
| $FeSO_4$ | 5.0 | 18 | 1 | 5 |
| $FeSO_4$ | 6.0 | 24 | 1 | 16 |
| $FeSO_4$ | 8.0 | 23 | 1 | 21 |
| $FeSO_4$ | 10.0 | 28 | 2 | 24 |
| $FeSO_4$ | 12.0 | 33 | 2 | 41 |
| $FeSO_4$ | 14.0 | 25 | 1 | 36 |
| $FeCl_3$ | 5.0 | 25 | 1 | 71 |

EXAMPLE III

This example illustrates the unexpected improvement that can be obtained by iron complexing a sulfited bark derivative when the same is used in various types of oil-emulsion muds.

A large sample of a mixture of comminuted hemlock and amabilis fir barks and a digestion liquor comprising an aqueous 75–25 solution of $NaHSO_3$—$Na_2SO_3$ equivalent to 0.07 part $SO_2$ per part dry bark was digested for 45 minutes at 170° C. in an autoclave. The digestion liquor was then separated from the bark residue and combined with pressings and washings. The pH being below 7.0, it was concentrated without adjustment to approximately 40% total solids. The concentrated liquor was then divided into two portions, one of which was spray dried without iron complexing. This product will be designated as (A) throughout the remainder of this example. The second portion of concentrated liquor was complexed with sufficient $FeSO_4 \cdot 7H_2O$ (copperas) in solution to supply 5% iron on the weight of the liquor solids and the mixture spray dried. Throughout the remainder of this example this product will be designated product (B).

A large batch of an oil-emulsion drilling mud typical of that commonly used in the field was prepared by mixing together the following components in the indicated proportions:

| | Lbs./bbl. |
|---|---|
| California clay | 37.4 |
| Texas clay | 37.4 |
| Bentonite | 4.3 |
| Water | 280.0 |
| CMC(Driscose) | 0.7 |
| Diesel oil | 32.8 |

This base mud was prehydrated, and all samples taken from it were aged for 16 hours at 70° C. before they were tested by regular A.P.I. methods.

*Section (a).*—This portion of the example illustrates the beneficial effect of iron complexing when the products of invention are used as additives for the control of a typical fresh water oil-emulsion mud and electrolyte contamination is not an important factor. As shown in the heading, products A and B are portions of the same batch of bark extract, except that B is complexed with 5% iron while A is not.

Aliquots of the above-described base mud were taken and the amounts of products A and B indicated in the table were added thereto as viscosity and gel strength control agents. After aging for 16 hours at 70° C., in the usual manner, they were stirred and tested by the standard A.P.I. methods. Each mud sample contained 0.5 lb./bbl. NaOH as a pH control. The results are set out in Table 3 and graphically illustrated in FIGURE 1.

*Table 3*

| Additive, lbs./bbl. | | Apparent visc., cps. | | Gel strengths, 0 mins. | | Lbs./100 sq. ft. 10 mins. | |
|---|---|---|---|---|---|---|---|
| A | B | A | B | A | B | A | B |
| 2 | 2 | 50 | 15 | 27 | 2 | 107 | 13 |
| 4 | 4 | 46 | 14 | 20 | 1 | 89 | 6 |
| 6 | 6 | 43 | 16 | 13 | 1 | 63 | 4 |
| 8 | 8 | 37 | 16 | 10 | 1 | 54 | 5 |
| 10 | 10 | 31 | 17 | 6 | 1 | 45 | 3 |
| 12 | 12 | 30 | 25 | 6 | 2 | 49 | 3 |
| 14 | 14 | 33 | 28 | 3 | 2 | 48 | 4 |

*Section (b).*—This section demonstrates that the unexpected improvement in effectiveness obtained by iron-complexing the additive when used in an ordinary oil-emulsion mud is retained when salt contamination is encountered. Product A is not complexed while product B contains 5% iron as before.

Figure 2:
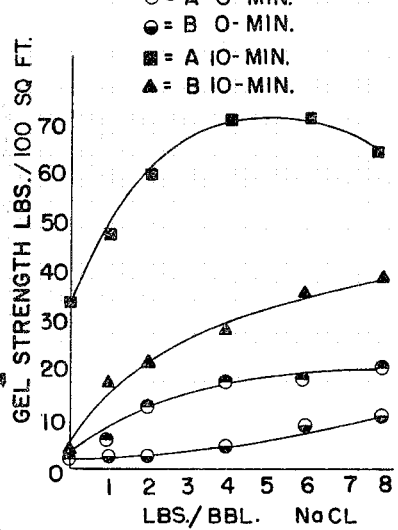
Figure 3:
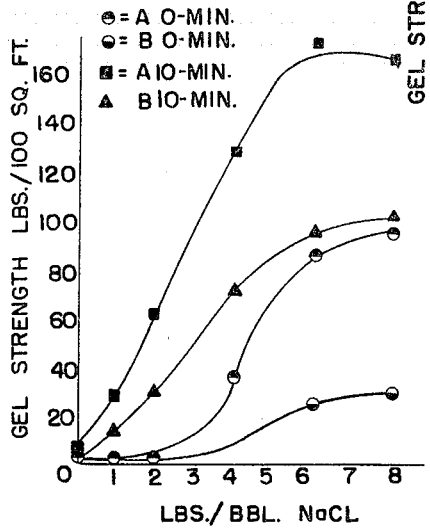

2.0 lbs./bbl. of additive, 0.38 lbs./bbl. NaOH and the indicated amounts of NaCl were added to aliquots of the base mud to form salt-contaminated low pH (7.8–8.6) oil-emulsion test mud samples for Table 4. Similar test mud samples were prepared for Table 5, except that 1.5 lbs./bbl. NaOH was used to get a high pH mud (10.4–10.6). Each of the foregoing test samples of mud was aged for 16 hours at 70° C., mixed, and tested by the standard A.P.I. methods in the usual manner. Results are set out in Tables 4 and 5, and graphically illustrated in FIGURES 2 and 3.

*Table 4 (low pH mud)*

| NaCl Added, lbs./bbl. | | Apparent Viscosity, cps. | | Gel Strengths, 0 mins. | | Lbs./100 sq. ft. 10 mins. | |
|---|---|---|---|---|---|---|---|
| A | B | A | B | A | B | A | B |
| 0 | 0 | 32 | 20 | 4 | 2 | 34 | 5 |
| 1 | 1 | 30 | 21 | 6 | 3 | 48 | 18 |
| 2 | 2 | 34 | 24 | 13 | 3 | 60 | 22 |
| 4 | 4 | 36 | 25 | 18 | 5 | 71 | 29 |
| 6 | 6 | 34 | 24 | 19 | 9 | 71 | 36 |
| 8 | 8 | 32 | 24 | 21 | 11 | 65 | 39 |

*Table 5 (High pH mud)*

| NaCl Added, lbs./bbl. | | Apparent Viscosity, cps. | | Gel Strengths, 0 mins. | | Lbs./100 sq. ft. 10 mins. | |
|---|---|---|---|---|---|---|---|
| A | B | A | B | A | B | A | B |
| 0 | 0 | 20 | 19 | 2 | 1 | 7 | 3 |
| 1 | 1 | 20 | 20 | 2 | 2 | 28 | 16 |
| 2 | 2 | 27 | 23 | 3 | 2 | 61 | 29 |
| 4 | 4 | 23 | 33 | 35 | 8 | 127 | 70 |
| 6 | 6 | 39 | 29 | 84 | 25 | 170 | 94 |
| 8 | 8 | 42 | 31 | 93 | 29 | 160 | 100 |

*Section (c).*—This section demonstrates that the improvement obtained by iron-complexing is retained when gypsum contamination is encountered.

Figure 4:
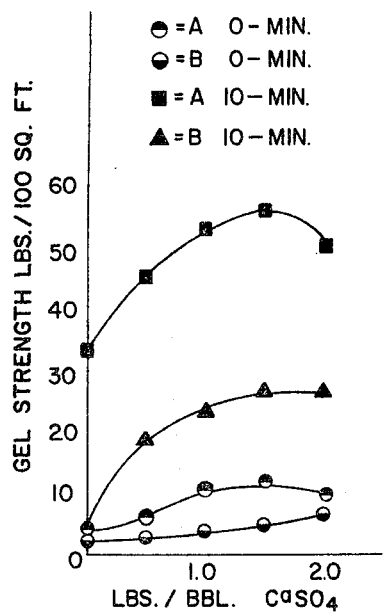
Figure 5:
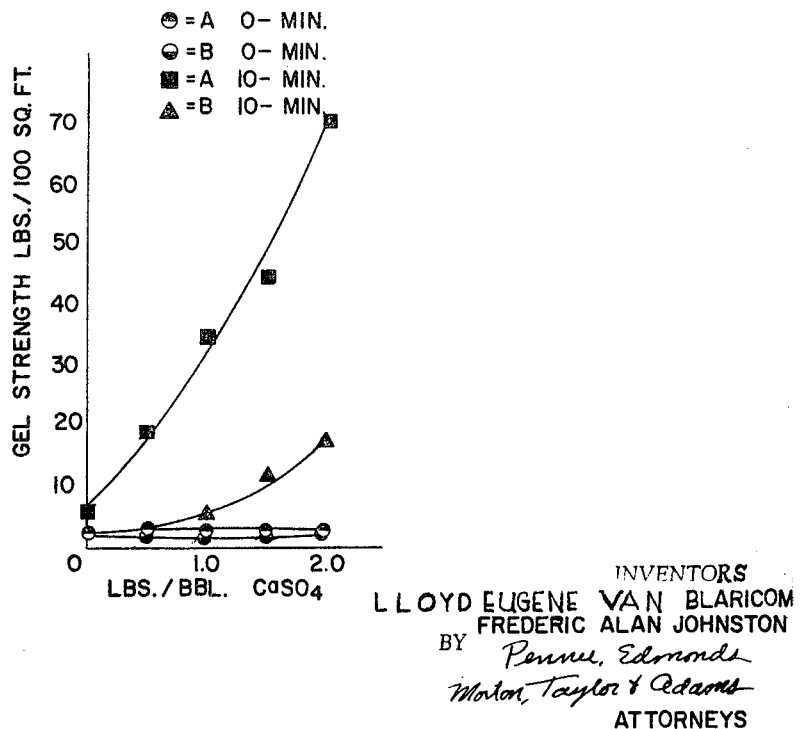

2.0 lbs./bbl. of additive, 0.5 lb./bbl. NaOH and the indicated amounts of gypsum ($CaSO_4$) were added to aliquots of the base mud to form the gypsum-contaminated test muds whose results are set out in Table 6. For comparison, similar mud samples were prepared, except that 1.5 lbs./bbl. NaOH was used for Table 7. The pH of the muds in Table 6 ranges from 8.0 to 8.8 and those in Table 7 between 10.10 and 10.60. Each of the test samples of mud was aged for 16 hours at 70° C., mixed and tested by the standard A.P.I. methods as before. Results are pictured graphically in FIGURES 4 and 5.

*Table 6 (low pH mud)*

| $CaSO_4$ added, lbs./bbl. | | Apparent Viscosity, cps. | | Gel Strengths 0 min. | | Lbs./100 sq. ft. 10 mins. | |
|---|---|---|---|---|---|---|---|
| A | B | A | B | A | B | A | B |
| 0 | 0 | 32 | 20 | 4 | 2 | 34 | 3 |
| 0.5 | 0.5 | 33 | 24 | 6 | 3 | 46 | 19 |
| 1.0 | 1.0 | 36 | 21 | 11 | 4 | 54 | 24 |
| 1.5 | 1.5 | 33 | 21 | 12 | 5 | 57 | 27 |
| 2.0 | 2.0 | 29 | 21 | 10 | 7 | 51 | 27 |

*Table 7 (high pH mud)*

| $CaSO_4$ added, lbs./bbl. | | Apparent viscosity, cps. | | Gel strengths, 0 min. | | Lbs./100 sq. ft. 10 mins. | |
|---|---|---|---|---|---|---|---|
| A | B | A | B | A | B | A | B |
| 0 | 0 | 23 | 19 | 2 | 2 | 6 | 3 |
| 0.5 | 0.5 | 27 | 21 | 3 | 2 | 19 | 3 |
| 1.0 | 1.0 | 30 | 21 | 3 | 2 | 35 | 5 |
| 1.5 | 1.5 | 30 | 22 | 3 | 2 | 45 | 12 |
| 2.0 | 2.0 | 27 | 22 | 3 | 3 | 71 | 18 |

EXAMPLE IV

It has been pointed out that the iron-complexing process of this invention improves the characteristics of only the sulfited derivative of bark and quebracho wood. To illustrate this fact, dual specimens of hemlock bark and quebracho wood were extracted with water only and with the sulfite liquor of Example I. The two types of extracts were then complexed with sufficient $FeSO_4 \cdot 7H_2O$ to add 5% of iron, and spray dried in the usual manner. The effectiveness of the various additives was then demonstrated on a gypsum mud.

A base mud was prepared by mixing 2500 parts California clay, 2500 parts Texas shale, 250 parts bentonite and 25,000 parts water with a propeller-type mixer and aging the mixture overnight at room temperature. Test samples were then prepared from this base mud by adding 5 lbs./bbl. gypsum, 0.4 lb./bbl. NaOH and 4.0 lbs./bbl. of additive to aliquots of the same, and mixing. Tests were made by the standard A.P.I. methods, and the results are set out in Table 8.

*Table 8*

| Type of Additive | Iron, percent | Apparent Viscosity, cps. | Gel Strengths, lbs./100 sq. ft. | | Fluid Loss, ml./30 min. |
|---|---|---|---|---|---|
| | | | 0 min. | 10 min. | |
| Quebracho (no sulfite) | 0 | 18.5 | 16 | 22 | 29.0 |
| Do | 5 | 22.0 | 27 | 28 | 35.0 |
| Quebracho (sulfited) | 0 | 12.0 | 10 | 32 | 25.0 |
| Do | 5 | 10.5 | 3 | 18 | 10.8 |
| Hemlock Bark (no sulfite) | 0 | 19.5 | 21 | 35 | 18.3 |
| Do | 5 | 31.0 | 24 | 24 | 22.0 |
| Hemlock Bark (sulfited) | 0 | 12.0 | 8 | 32 | 14.4 |
| Do | 5 | 13.0 | 3 | 17 | 10.1 |

Derivatives prepared from bark and quebracho wood are often used in clay-containing drilling muds for control of fluid loss as well as for rheological purposes. The products of the present invention are also reasonably effective when so used, and their effectiveness becomes quite pronounced if greater than normal amounts are used, say from 10 to 20 lbs./bbl. This property sometimes becomes quite valuable when very deep wells are being drilled.

EXAMPLE V

This example illustrates the use of the sulfited extract of hemlock bark of Example I in a fresh water drilling mud.

For comparability of results in mud testing, a large sample of base mud was prepared by mixing 800 parts of bentonite clay with 8000 parts distilled water and aging the mixture overnight at room temperature. The base mud was remixed for 15 minutes at high speed with a propeller type mixer and then was ready for use. Test samples of fresh water mud were prepared from the base mud by taking aliquots and adding thereto NaOH to a pH between 9.5 and 10 and additive at the rate of 2 lb./bbl. The test samples were then mixed at high speed for 10 minutes, aged overnight at 70° C., remixed and tested by procedures approved by the American Petroleum Institute (A.P.I.). The results are tabulated in the following table and clearly show the unexpected increase in effectiveness of the complexed products.

Table 9

| Percent Fe in Product | pH | Viscosity, cp. | 0 Gel | 10 min. Gel | Fluid Loss, ml./30 min. |
|---|---|---|---|---|---|
| 0 | 8.1 | 33 | 6 | 31 | 7.0 |
| 1 | 8.1 | 33.5 | 5 | 25 | 6.8 |
| 2 | 8.05 | 32.5 | 4 | 14 | 6.6 |
| 3 | 8.1 | 30.5 | 3 | 8 | 6.8 |
| 4 | 8.05 | 29 | 3 | 5 | 7.2 |
| 5 | 8.05 | 28.5 | 3 | 5 | 7.8 |
| 6 | 8.0 | 28 | 2 | 4 | 7.6 |
| 8 | 8.05 | 26.5 | 3 | 5 | 7.8 |
| 10 | 8.05 | 26 | 2 | 4 | 8.0 |
| 12 | 8.1 | 25.5 | 2 | 4 | 8.4 |
| 10% Wyoming Bentonite, 2 lb./bbl. additive, pH to 9.5 | | | | | |
| 8 | 8.0 | 65.5 | 3 | 7 | 6.6 |
| 10 | 8.0 | 58.5 | 3 | 8 | 7.4 |
| 12 | 8.05 | 59.5 | 3 | 8 | 7.6 |
| 14 | 8.0 | 55.0 | 3 | 12 | 7.8 |
| (¹) | 8.2 | 126.0 | 93 | 122 | 7.2 |

¹ No additive (Control).

EXAMPLE VI

Sulfited bark products were prepared from the barks of hemlock, redwood, Douglas fir, Southern pine and spruce by the method used in Example I and tested in fresh water muds as in Example V. The following table demonstrates that iron complexing is equally beneficial in each type of bark:

Table 10

| Additive | | pH | Visc., cp. | Gel Strength | | Fluid Loss, ml./30 min. API |
|---|---|---|---|---|---|---|
| Bark | Percent Fe | | | 0 min. | 10 min. | |
| Hemlock | 0 | 8.15 | 63.5 | 18 | 51 | 6.9 |
| Do | 5 | 8.10 | 54.0 | 4 | 8 | 7.2 |
| Redwood | 0 | 8.1 | 86.5 | 22 | 67 | 6.3 |
| Do | 5 | 8.15 | 78.5 | 5 | 24 | 6.6 |
| Douglas fir | 0 | 8.15 | 75.5 | 19 | 59 | 6.6 |
| Do | 5 | 8.05 | 77.0 | 6 | 23 | 7.0 |
| Southern pine | 0 | 8.05 | 71.0 | 23 | 58 | 7.0 |
| Do | 5 | 8.1 | 63.0 | 4 | 12 | 6.8 |
| Spruce | 0 | 8.1 | 70.0 | 28 | 59 | 6.5 |
| Do | 5 | 8.15 | 65.0 | 3 | 10 | 6.5 |

EXAMPLE VII

This example shows that in fresh water muds, on a pound for pound basis, the products of the invention are superior to commercial quebracho wood extract such as presently used in huge quantities in drilling mud operations.

In this example API tests were made in a Wyoming bentonite fresh water mud similar to the one described in Example V. The bark product additive was derived from hemlock bark and complexed with 4.5% iron. The quebracho wood extract was a commercial product widely used as a fresh water drilling mud additive. The results clearly show the superiority of the sulfited, iron-complexed product of the invention.

Table 11

| Additive | Conc., lbs./bbl. | pH | Visc., cps. | Gel strength | | Fluid loss, ml./30 min. API |
|---|---|---|---|---|---|---|
| | | | | 0 min. | 10 min. | |
| Quebracho | 0 | 8.3 | 100.5 | 75 | 118 | 6.9 |
| Quebracho | 0.5 | 8.3 | 89.0 | 47 | 72 | 6.2 |
| Hemlock | 0.5 | 8.35 | 79.5 | 23 | 64 | 7.0 |
| Quebracho | 1.0 | 8.25 | 84.0 | 36 | 67 | 6.1 |
| Hemlock | 1.0 | 8.55 | 97.5 | 13 | 59 | 6.7 |
| Quebracho | 2.0 | 8.35 | 82.0 | 35 | 67 | 5.5 |
| Hemlock | 2.0 | 8.6 | 82.0 | 5 | 17 | 6.6 |
| Quebracho | 4.0 | 8.55 | 94.5 | 42 | 70 | 5.2 |
| Hemlock | 4.0 | 8.45 | 73.5 | 3 | 5 | 6.2 |
| Quebracho | 8.0 | 8.75 | 115.0 | 50 | 85 | 4.9 |
| Hemlock | 8.0 | 8.05 | 65.5 | 4 | 6 | 5.2 |
| Quebracho | 14.0 | 9.9 | 126.0 | 49 | 83 | 3.6 |
| Hemlock | 14.0 | 8.5 | 66.5 | 7 | 10 | 4.8 |

We claim:

1. The ferrous complexed water-soluble sulfonated polyflavonoid product produced by digesting a coniferous bark or quebracho in an aqueous solution of sodium sulfite or potassium sulfite or sodium bisulfite or potassium bisulfite in an amount sufficient to supply from 0.03 to 0.2 part of $SO_2$ per part of bone dry bark or quebracho, said digestion being at a temperature of from 105° to 200° C. for from 15 to 240 minutes to form a soluble sulfonated polyflavonoid, and reacting the sulfonated polyflavonoid in an aqueous solution with sufficient ferrous sulfate to supply from 2.0 to 14% of iron based on the total weight of sulfonated polyflavonoid forming the ferrous complexed polyflavonoid product.

2. The product defined in claim 1 which is formed by digesting in said process one of the coniferous barks: hemlock, redwood, Douglas fir, Southern pine and spruce, and quebracho in the aqueous solution at a temperature of from 150° to 175° C. using care so that no free sulfurous acid is present during said digestion, and complexing said sulfonated polyflavonoid with ferrous sulfate at a pH of 4.5 to 6.

References Cited by the Examiner

UNITED STATES PATENTS 2,831,022  4/1958  Van Blaricon et al. __ 260—512
2,935,504  5/1960  King et al. _____ 260—124

OTHER REFERENCES

Hergert, J. Org. Chem. 21 (1956) 534–6.

WALTER A. MODANCE, *Primary Examiner.*
JOHN D. RANDOLPH, CHARLES PARKER,
*Examiners.*
DELBERT R. PHILLIPS, JAMES A. PATTEN,
*Assistant Examiners.*